United States Patent
Song

(10) Patent No.: US 8,953,241 B2
(45) Date of Patent: Feb. 10, 2015

(54) AUTOSTEREOSCOPIC DISPLAY APPARATUS AND METHOD

(75) Inventor: Lei Song, Shenzhen (CN)

(73) Assignee: SuperD Co. Ltd., Shenzhen (CN)

( * ) Notice: Subject to any disclaimer, the term of this patent is extended or adjusted under 35 U.S.C. 154(b) by 396 days.

(21) Appl. No.: 12/953,621

(22) Filed: Nov. 24, 2010

(65) Prior Publication Data

US 2012/0092763 A1    Apr. 19, 2012

(30) Foreign Application Priority Data

Oct. 19, 2010  (CN) .......................... 2010 1 0511742

(51) Int. Cl.
*G02B 27/22*    (2006.01)
*H04N 13/04*    (2006.01)

(52) U.S. Cl.
CPC ........ *G02B 27/2214* (2013.01); *H04N 13/0404* (2013.01); *H04N 13/0411* (2013.01); *H04N 13/0415* (2013.01)
USPC .......................................... 359/463; 359/462

(58) Field of Classification Search
USPC ................. 359/619–628, 423, 462, 473, 475, 359/376–378; 348/55–56, 59; 353/7
See application file for complete search history.

(56) References Cited

U.S. PATENT DOCUMENTS

| | | | | |
|---|---|---|---|---|
| 6,064,424 | A * | 5/2000 | van Berkel et al. | 348/51 |
| 2008/0273242 | A1* | 11/2008 | Woodgate et al. | 359/495 |
| 2008/0316379 | A1* | 12/2008 | Zuidema et al. | 349/15 |
| 2009/0091667 | A1* | 4/2009 | Schultz et al. | 349/15 |
| 2009/0273834 | A1* | 11/2009 | Korenaga | 359/463 |
| 2010/0259819 | A1* | 10/2010 | Hiddink et al. | 359/463 |

FOREIGN PATENT DOCUMENTS

| | | | | |
|---|---|---|---|---|
| JP | 2000030024 A | * | 1/2000 | G06K 19/07 |
| JP | 2005031809 A | * | 2/2005 | G06T 5/20 |
| JP | 2008287430 A | * | 11/2008 | |
| JP | 2010123083 A | * | 6/2010 | |

* cited by examiner

*Primary Examiner* — William Choi
*Assistant Examiner* — Sharrief Broome
(74) *Attorney, Agent, or Firm* — Anova Law Group, PLLC

(57) ABSTRACT

An autostereoscopic display apparatus is provided for three-dimensional (3D) display. The autostereoscopic display apparatus includes a display panel having a plurality of display elements arranged in a two-dimensional array. The autostereoscopic display apparatus also includes a grating device coupled to the display device and having a plurality of grating elements to guide lights associated with 3D display into predetermined viewing directions. Further, the plurality of grating elements cover the plurality of display elements and are tilted such that a tilted direction of the plurality of grating elements form a non-zero angle with respect to a diagonal direction of the plurality display elements.

23 Claims, 7 Drawing Sheets

AUTOSTEREOSCOPIC DISPLAY APPARATUS AND METHOD

CROSS-REFERENCES TO RELATED APPLICATIONS

This application claims the priority of Chinese patent application no. 201010511742.2 filed on Oct. 19, 2010, the entire contents of which are incorporated herein by reference.

FIELD OF THE INVENTION

The present invention generally relates to autostereoscopic display technologies and, more particularly, to methods and systems for reducing or removing Moire pattern in autostereoscopic display apparatus.

BACKGROUND

Nowadays, autostereoscopic display technologies are rapidly developing and there are increasingly demands on high performance autostereoscopic display devices. Autostereoscopic display devices do not require viewers to wear glasses with special lenses to achieve three dimensional (3D) perceptions.

FIG. 1 illustrates a conventional autostereoscopic display apparatus 1. Display apparatus 1 comprises a lenticular sheet 12 coupled to a pixel matrix-based display panel 11. Lenticular sheet 12 comprises a plurality of vertical lenticular elements aligned in parallel in the horizontal direction of display panel 11.

FIG. 2 illustrates another conventional autostereoscopic display apparatus 2. Display apparatus 2 comprises a parallax barrier 13 coupled to a pixel matrix-based display panel 11. Parallax barrier 13 comprises a plurality of vertical slits aligned in parallel in the horizontal direction of display panel 11.

However, such conventional autostereoscopic display apparatus often has Moire patterns, as a Moire pattern is a natural interference phenomenon that occurs when two separate periodically repetitive structures are overlapped with each other. In a conventional autostereoscopic display apparatus, Moire patterns appear because the regularly spaced grating elements interfere with the underlying display panel which has a grid structure. Moire pattern manifests itself as dark bands passing across the screen. This phenomenon renders 3D viewing experience uncomfortable and less pleasant to the viewer.

The disclosed methods and apparatus are directed to solve one or more problems set forth above and other problems.

BRIEF SUMMARY OF THE DISCLOSURE

One aspect of the present disclosure includes an autostereoscopic display apparatus. The autostereoscopic display apparatus includes a display panel having a plurality of display elements arranged in a two-dimensional array. The autostereoscopic display apparatus also includes a grating device coupled to the display device and having a plurality of grating elements to guide lights associated with three-dimensional (3D) display into predetermined viewing directions. Further, the plurality of grating elements cover the plurality of display elements and are tilted such that a tilted direction of the plurality of grating elements form a non-zero angle with respect to a diagonal direction of the plurality display elements.

Another aspect of the present disclosure includes a grating for use in an autostereoscopic display apparatus. The autostereoscopic display apparatus includes a display panel having a plurality of display elements arranged in a two-dimensional array. The grating includes a plurality of grating elements configured to cover the plurality of display elements to guide lights associated with three-dimensional (3D) display into predetermined viewing directions. Further, the plurality of grating elements are tilted such that a tilted direction of the plurality of grating elements form a non-zero angle with respect to a diagonal direction of the plurality display elements.

Another aspect of the present disclosure includes a method for use in an autostereoscopic display apparatus. The autostereoscopic display apparatus includes a display panel having a plurality of display elements arranged in a two-dimensional array. The method includes covering the plurality of display elements using a plurality of grating elements of a grating. The method also includes configuring the plurality of grating elements to be tilted such that a tilted direction of the plurality of grating elements form a non-zero angle with respect to a diagonal direction of the plurality display elements. Further, the method includes guiding lights associated with three-dimensional (3D) display into predetermined viewing directions by the plurality of grating elements.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
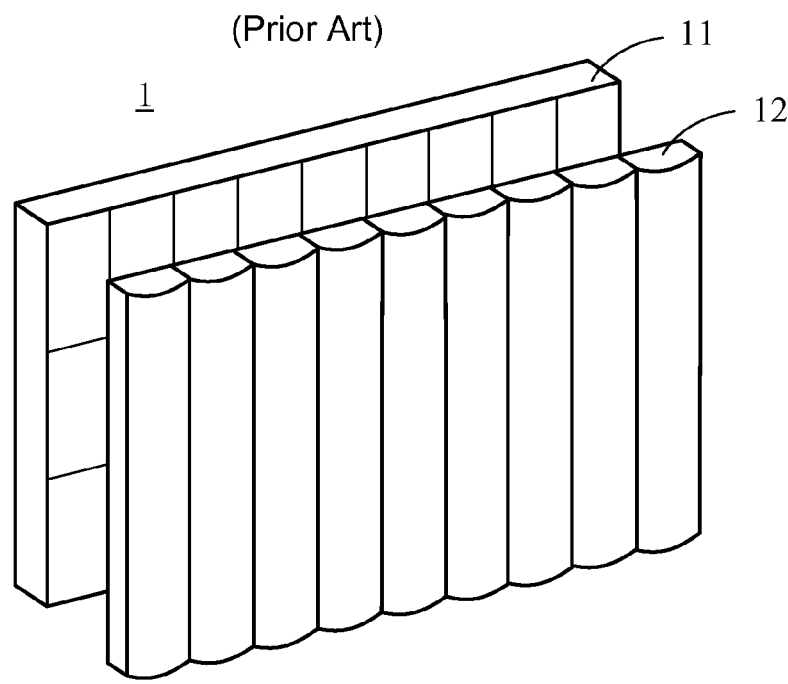
FIG. 1 illustrates a conventional autostereoscopic display apparatus.
Figure 2:
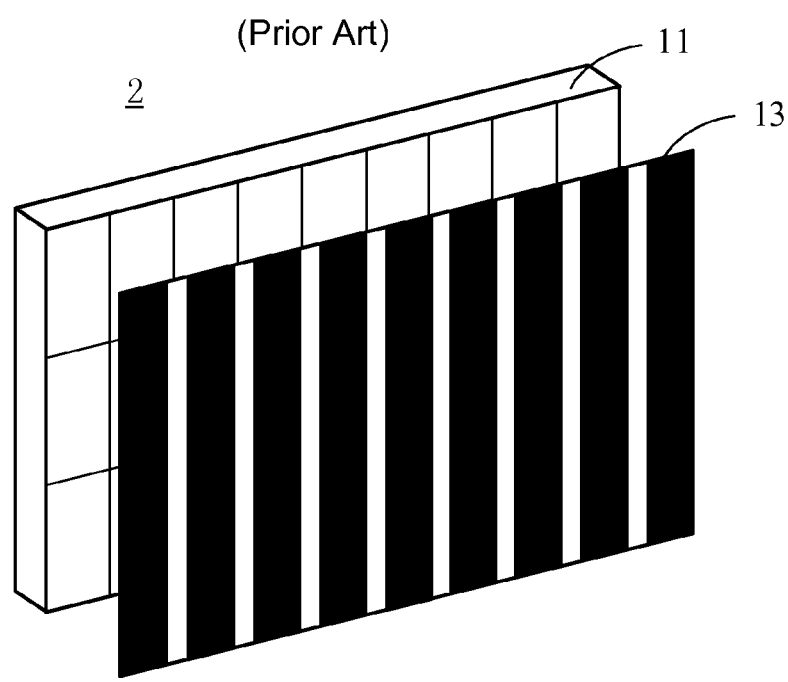
FIG. 2 illustrates another conventional autostereoscopic display apparatus.
Figure 3:
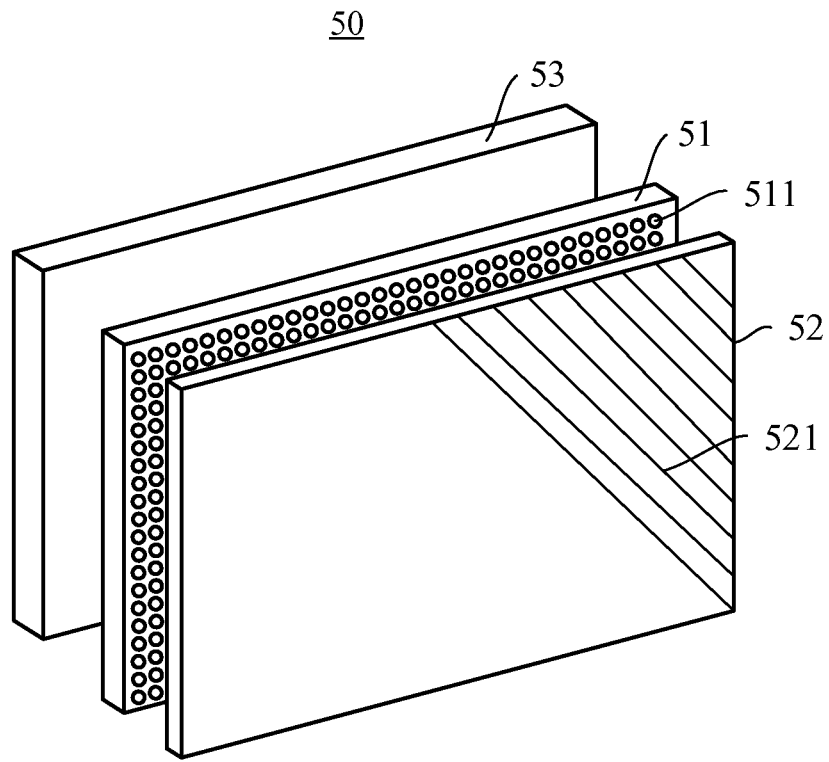
FIG. 3 illustrates an exemplary autostereoscopic display apparatus consistent with the disclosed embodiments.

FIG. 3 illustrates an exemplary autostereoscopic display apparatus consistent with the disclosed embodiment. As shown in FIG. 3, autostereoscopic display apparatus 50 comprises a display panel 51, a grating 52, and a backlight panel 53. Grating 52 is positioned parallel to display panel 51 or closely coupled to display panel 51.

Display panel 51 may include any appropriate display panel, such as a liquid crystal display (LCD) panel, a plasma display panel (PDP), a cathode ray tube (CRT) display, an organic light emitting diode(OLED), etc. Display panel 51 may include a plurality of individually addressable, regularly spaced, and substantially identical display elements 511. Display elements 511 may be arranged in rows and columns. Further, display panel 51 may be illuminated by backlight panel 53. Lights from backlight panel 53 are directed through display panel 51 with the display elements 511 individually addressed to produce a display output. In autostereoscopic display apparatus 50, a three-dimensional (3D) image usually includes a multitude of views corresponding to different viewing angles. These views may be spliced into the 3D image (i.e., a 3D display image). For example, a stereo format 3D image may include two images, a left image to be viewed by a viewer's left eye and a right image to be viewed by the viewer's right eye. Horizontally adjacent display elements 511 may display image elements belong to different views.

Grating 52 may include any appropriate type of grating device, such as a lenticular lens screen or a slit grating device. Grating 52 may include a plurality of grating elements 521 (only shown partially), and the plurality of grating elements 521 may be arranged in parallel with a predetermined interval. Further, grating elements 521 may be aligned over display panel 51 such that a single grating element 521 may cover two or more display elements 511.

Grating element 521 may include any appropriate optical element capable of separating adjacent views by directing lights from horizontally or vertically adjacent display elements 511 into different directions to be viewed by a viewer's left eye and right eye separately to achieve a 3D perception. In other words, grating 52 guides lights associated with 3D display into predetermined viewing directions to achieve 3D perception by the viewer. In certain embodiments, grating element 521 may include a lenticular lens or a parallax barrier (e.g., a slit).

Figure 4:
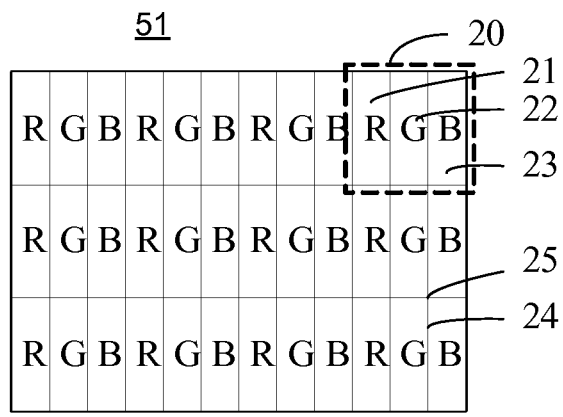
FIG. 4 illustrates exemplary display elements of a display panel consistent with the disclosed embodiments.

FIG. 4 illustrates a portion of display panel 51. As explained, display panel 51 includes a plurality of display elements 511. In certain embodiments, a display element 511 may include a pixel or a sub-pixel. That is, as shown in FIG. 4, display panel 51 may include a plurality of pixels 20. Pixel 20 may include several sub-pixels, such as a red sub-pixel 21, a green sub-pixel 22, and a blue sub-pixel 23. Other types of sub-pixels may also be included. Sub-pixels may be considered as basic display elements in display panel 51. Further, black mask line 24 may be used to define the borders of each individual display element 511. A plurality of rows and columns of black mask lines 24 form a grid with a plurality of points of intersection 25. The plurality of display pixels 20 may form a two-dimensional matrix arranged vertically and horizontally. Sub-pixels may be substantially identical in size and may be in rectangular shapes.

Figure 5:
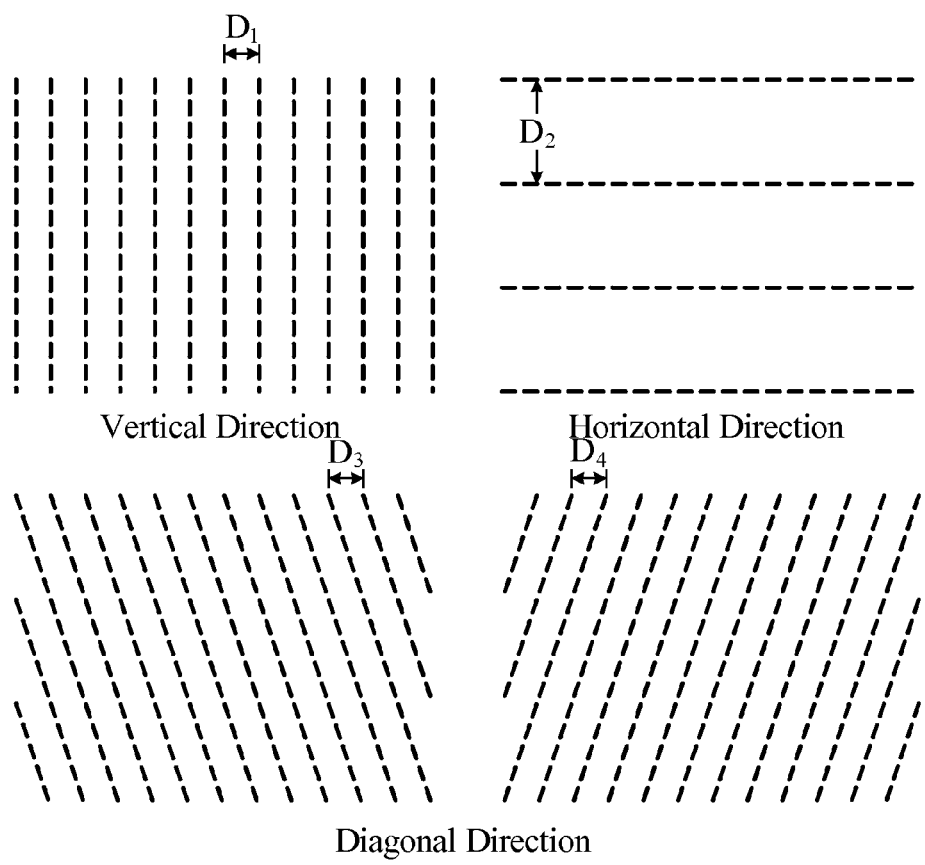
FIG. 5 illustrates exemplary grating arrangement positions consistent with the disclosed embodiments.

Grating 52 may be coupled to display panel 51 such that grating elements 521 may cover corresponding display elements 511 of display panel 51. FIG. 5 illustrates various arrangements for grating elements 521 to cover display panel 51.

As shown in FIG. 5, grating elements 521 may be arranged in a vertical direction with a pitch $D_1$; in a horizontal direction with a pitch $D_2$; in a diagonal direction tilted left with a pitch $D_3$; or in a diagonal direction tilted right with a pitch $D_4$. Because the regularity of arranged grating elements 521 and the regularity of display elements 511 of display panel 51, Moire pattern may appear.

Figure 6:
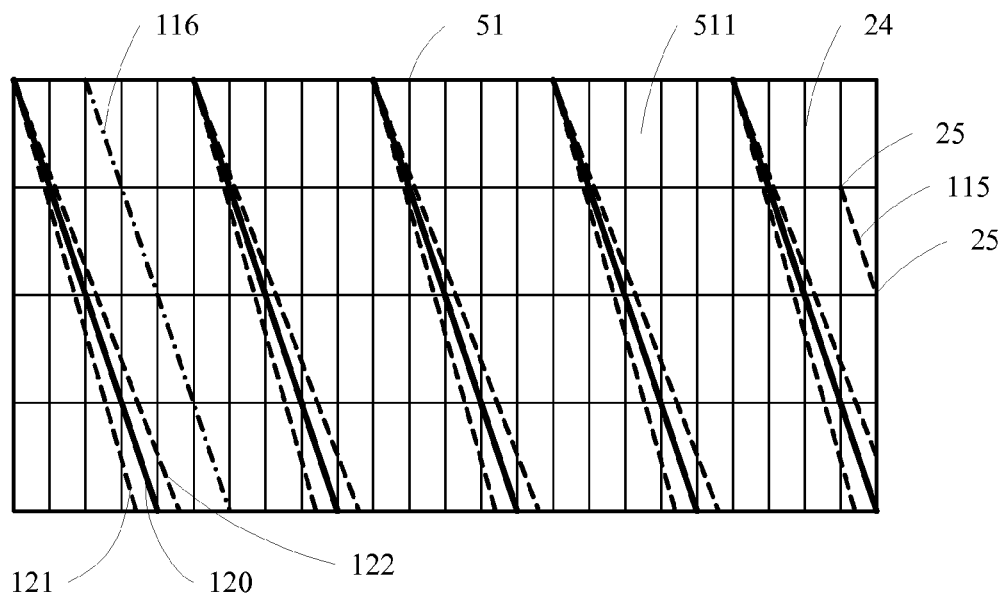
FIG. 6 illustrates an exemplary arrangement of a grating and a display panel consistent with the disclosed embodiments.

FIG. 6 illustrates another exemplary arrangement of grating elements of grating 52 with respect to display panel 51. Display panel 51 comprises a plurality of display element 511 which are separated by black mask lines 24 in both horizontal and vertical directions. Horizontal and vertical black mask lines 24 create a grid of display elements. For example, corner points 25 may be formed when creating the grid. A diagonal direction 115 may be referred to as the diagonal line connecting two opposing corner points in a same grid unit.

Display panel 51 or display elements 511 may also have a diagonal direction 116, which may be referred as the diagonal line of an individual display element 511 and thus also as the diagonal line of all corresponding regularly arranged display elements 511 across display panel 51.

Further, grating 52 is coupled to display panel 51 and includes a plurality of grating elements 521. Only certain number grating elements are illustrated here, as grating ridge lines 120, grating ridge lines 121, and grating ridge lines 122 illustrate individual grating elements 521 at different locations. A ridge line may refer to a center line of a grating element 521 or a bottom border line of a grating element 521 used to indicate a position and a slant angle of the grating element 521. Other lines may also be included to indicate positions and slant angles of plurality of grating elements 521. Among ridge lines 120, 121, and 122, ridge line 120 may be referred to as a reference ridge line, and ridge lines 121 and 122 are actual ridge lines of two different arrangements between grating 52 and display panel 51. Ridge lines 120, 121, and 122 may be tilted (e.g., with a slant angle).

As shown in FIG. 6, reference ridge line 120 may be parallel to diagonal line 116 of display panel 51, which may also be parallel to diagonal line 115 of black mask line grid. Although this arrangement may allow individual display elements 511 to be divided equally into two parts of same shape and same size to create desired 3D images, the substantial evenness and regularity provided by this arrangement may cause substantial Moire patterns.

Thus, actual ridge lines 121 and 122 are formed based on reference ridge line 120 to reduce or remove Moire patterns. As shown in FIG. 6, in certain embodiments, actual ridge line 121 is used to arrange grating elements 521 with respect to display panel 51; while in certain other embodiments, actual ridge line 122 is used to arrange grating elements 521 with respect to display panel 51. Further, any lines between actual ridge lines 120 and 121 may be used as an actual ridge line for grating elements 521.

Actual ridge line 121 is formed by rotating reference ridge line 120 clockwise by a certain degree (a positive degree), and actual ridge line 122 is formed by rotating reference ridge line 120 counter-clockwise by a certain degree (a negative degree). The rotation pivotal point may be any end point of reference ridge line 120 (e.g., the upper end of reference ridge line 120) or an intersection point between actual ridge line 120 and a diagonal direction of display elements 511. Such positive and negative adjustment to reference ridge line 120 may create arrangements with substantially less Moire pattern than reference ridge line 120.

Further, any appropriate degrees of adjustment angle (i.e., the angle between a ridge line and the diagonal direction of display elements 511) may be used to adjust reference ridge line 120. For example, an adjustment range may be set to between −5 to +10 degrees, with the diagonal direction as reference. In certain embodiments, the adjustment range may be set to between −2 to +7 degrees. Within this adjustment ranges, any angle may be used based on particular applications. Different angles within the adjustment range may also be tested to choose a desired angle such that a pitch of Moire pattern is so small that the Moire pattern cannot be distinguished by human eyes. Further, the slant angle of grating elements 521 may also be adjusted to accommodate various display panels for removing Moire patterns from autostereoscopic display screens.

Figure 7:
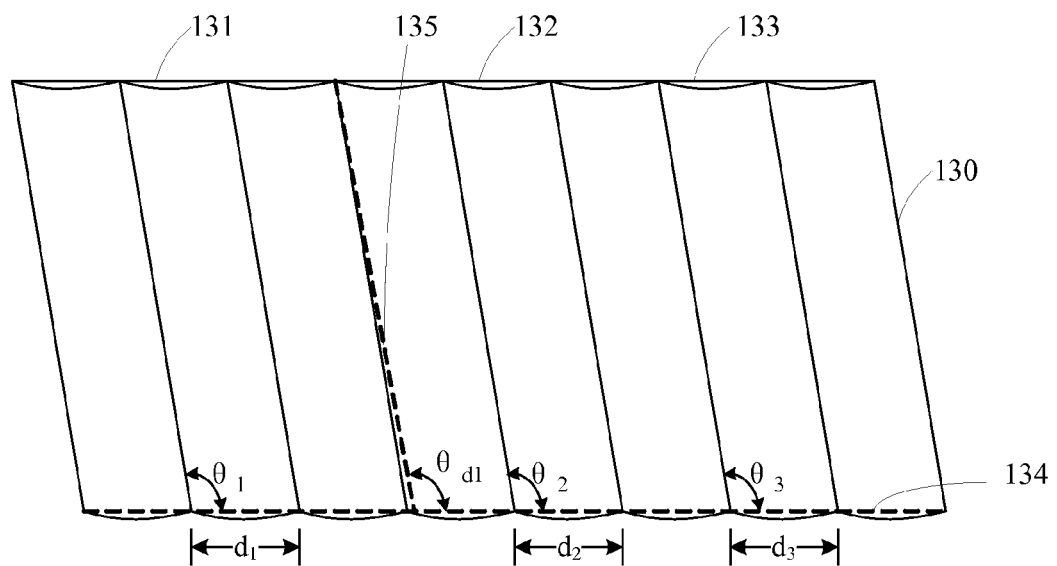
FIG. 7 illustrates another exemplary arrangement of a grating and a display panel consistent with the disclosed embodiments.

As explained previously, grating 52 may include any appropriate grating devices, such as a lenticular lens screen or a slit grating. FIG. 7 illustrates an exemplary arrangement of a lenticular lens screen with respect to display panel 51. As shown in FIG. 7, lenticular lens screen or lenticular sheet 130 comprises a plurality of lenticular lenses or elements 131, 132, and 133. A cross-section direction 134 of lenticular sheet 130 aligns with the horizontal direction of display panel 51. A diagonal direction 135 of display panel 51 may form an angle $\theta_{d1}$ with respect to cross-section direction 134 or the horizontal direction.

Lenticular elements 131, 132, and 133 are individual lenticular elements listed for illustrative purposes. Any lenticular element may be used. As shown in FIG. 7, lenticular element 131 has a pitch $d_1$ and an angle $\theta_1$ with respect to cross-section direction 134 or the horizontal direction. Lenticular element 132 has a pitch $d_2$ and an angle $\theta_2$ with respect to cross-section direction 134 or the horizontal direction. Further, lenticular element 133 has a pitch $d_3$ and an angle $\theta_3$ with respect to cross-section direction 134 or the horizontal direction.

Lenticular elements 131, 132, and 133 are arranged un-parallel to diagonal direction 135 of display panel 51. In other words, angles $\theta_1$, $\theta_2$ and $\theta_3$ are different from $\theta_{d1}$. The difference between $\theta_{d1}$ and any of angles $\theta_1$, $\theta_2$ and $\theta_3$ may be the adjustment angle explained with respect to FIG. 6. Such arrangement may reduce Moire pattern to certain level beyond recognition of human eyes. Further, lenticular elements 131, 132 and 133 may extend or arranged in parallel with one another, which means angles $\theta_1$, $\theta_2$ and $\theta_3$ have the same value. Further, pitches $d_1$, $d_2$ and $d_3$ may also be of the same value.

Figure 8:
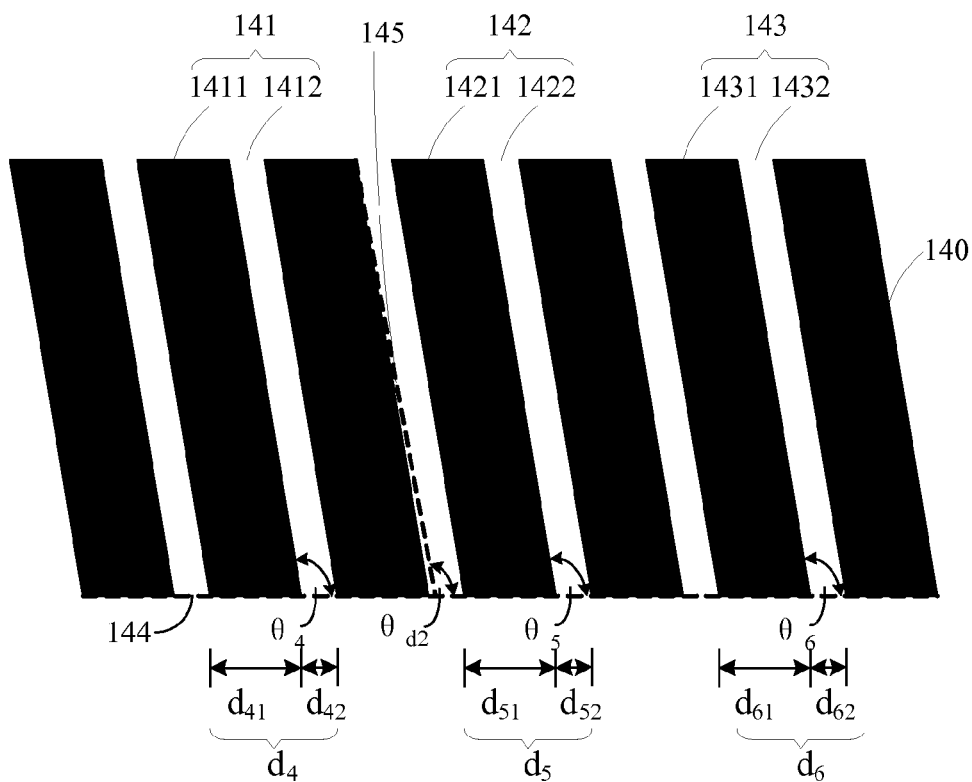
FIG. 8 illustrates another exemplary arrangement of a grating and a display panel consistent with the disclosed embodiments.

FIG. 8 illustrates an exemplary arrangement of a parallax barrier with respect to display panel 51. As shown in FIG. 8, parallax barrier 140 includes a plurality of parallax barrier elements 141, 142, and 143. Parallax barrier element 141 includes a barrier portion 1411 and a slit portion 1412. Similarly, parallax barrier element 142 includes a barrier portion 1421 and a slit portion 1422, and parallax barrier element 143 includes a barrier portion 1431 and a slit portion 1432. A cross-section direction 144 of parallax barrier 140 aligns with the horizontal direction of display panel 51. A diagonal direction 145 of display panel 51 may form an angle $\theta_{d2}$ with respect to cross-section direction 144 or the horizontal direction.

Parallax barrier elements 141, 142, and 143 are individual parallax barrier elements shown for illustrative purposes. Any parallax barrier element may be used. As shown in FIG. 8, parallax barrier element 141 has a pitch $d_4$ (barrier portion 1411 has a pitch $d_{41}$, and slit portion has a pitch $d_{42}$, $d_4=d_{41}+d_{42}$) and an angle $\theta_4$ with respect to cross-section direction 144 or the horizontal direction. Parallax barrier element 142 has a pitch $d_5$ (barrier portion 1421 has a pitch $d_{51}$, and slit portion has a pitch $d_{52}$, $d_5=d_{51}+d_{52}$) and an angle $\theta_5$ with respect to cross-section direction 144 or the horizontal direction. Further, parallax barrier element 143 has a pitch $d_6$ (barrier portion 1431 has a pitch $d_{61}$, and slit portion 1432 has a pitch $d_{62}$, $d_6=d_{61}+d_{62}$) and an angle $\theta_6$ with respect to cross-section direction 144 or the horizontal direction.

Parallax barrier elements 141, 142, and 143 are arranged un-parallel to diagonal direction 145 of display panel 51. In other words, angles $\theta_4$, $\theta_5$ and $\theta_6$ are different from $\theta_{d2}$. The difference between $\theta_{d2}$ and any of angles $\theta_4$, $\theta_5$ and $\theta_6$ may be the adjustment angle explained with respect to FIG. 6. Such arrangement may reduce Moire pattern to certain level beyond recognition of human eyes. Further, parallax barrier elements 141, 142 and 143 may extend in parallel with one another, which means angles $\theta_4$, $\theta_5$ and $\theta_6$ are of the same value. In addition, pitches $d_4$, $d_5$ and $d_6$ may also be of the same value. Barrier portion pitches $d_{41}$, $d_{51}$ and $d_{61}$ and/or slit pitches $d_{42}$, $d_{52}$ and $d_{62}$ may also be of the same values.

The gratings in the above examples are not limited to lenticular sheet gratings and parallax barrier gratings. Those skilled in the art understand many different types of gratings may be used. Further, the gratings can be of static or dynamic nature. For example, a slant angle, pitch, thickness, etc, of a lenticular sheet or a parallax barrier grating may be dynamically adjusted mechanically or by using piezoelectric or electro-optic devices.

Figure 9:
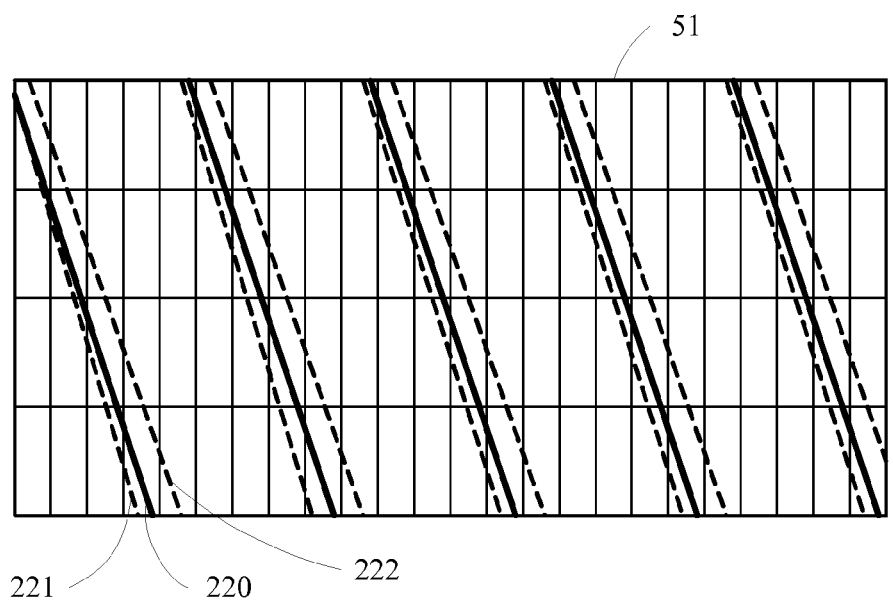
FIG. 9 illustrates another exemplary arrangement of a grating and a display panel consistent with the disclosed embodiments.

FIG. 9 illustrates another exemplary arrangement of grating 52 with respect to display panel 51. This exemplary arrangement is similar to that described in FIG. 6, with a reference ridge line 220 and actual ridge lines 221 and 222. The difference between FIG. 9 and FIG. 6 is that, in addition to rotation of the reference ridge 220, actual ridge lines 221 and/or 222 may also have a shift along the horizontal direction. Both rotation and shifting may be more flexible than rotation only. Further, the angle adjustment for actual ridge lines 221 and 222 may be set to a range of −5 to 10 degrees.

Figure 10:
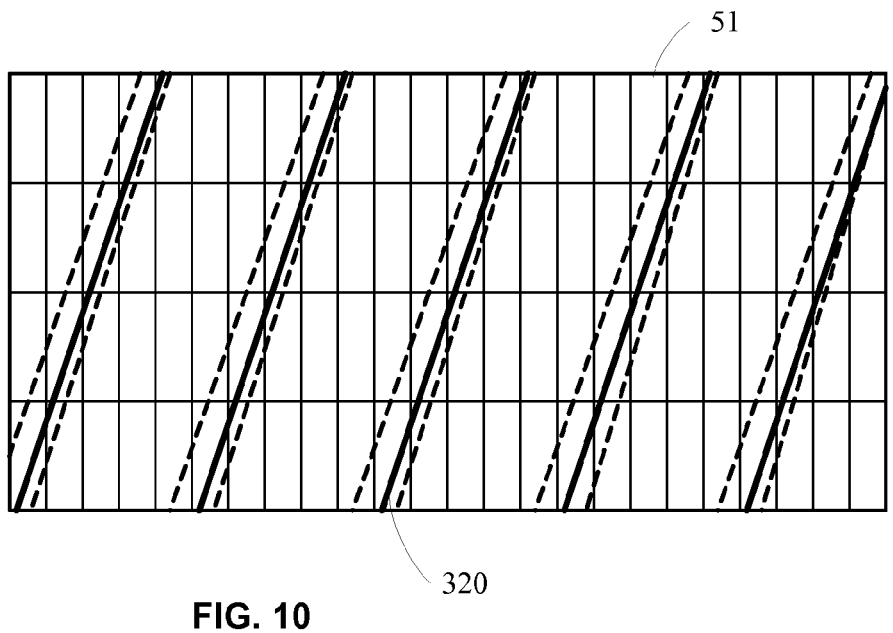
FIG. 10 illustrates another exemplary arrangement of a grating and a display panel consistent with the disclosed embodiments.

FIG. 10 illustrates yet another exemplary arrangement of grating 52 with respect to display panel 51. This exemplary arrangement is similar to that described in FIG. 9. The difference is that, in this arrangement, reference ridge line 320 of grating 52 is aligned parallel to the other diagonal direction of display panel 51 (e.g., tilted right instead of left).

Moire pattern may be effectively removed by using the above-mentioned systems and methods. However, because the rotation and/or shifting, display elements may be unable to completely evenly and regularly align with grating elements. Lights from display elements may be processed by grating elements with irregularity. For example, display elements belong to one view may then be misdirected to adjacent views instead. Suitable image processing algorithms may be used to compensate the irregularity of intersection between the grating elements and display elements.

Autostereoscopic display apparatus 50 may also include a controller (not shown) for providing control and operation functions for autostereoscopic display apparatus 50. For example, the controller may provide driving voltages to various components of autostereoscopic display apparatus 50. The controller may also provide image processing functions during run-time to improve display quality of autostereoscopic display apparatus 50.

The controller may include a processor such as a graphic processing unit (GPU), general purpose microprocessor, digital signal processor (DSP) or microcontroller, and application specific integrated circuit (ASIC). The controller may also include other devices such as memory devices, communication devices, input/output devices, driving circuitry, and storage devices, etc. The controller may also execute sequences of computer program instructions to perform various processes associated with autostereoscopic display apparatus 50. For example, during operation, the controller may perform an image processing process to adjust display quality due to the irregularity of intersection between grating elements and display elements.

More particularly, the controller may re-calculate or adjust values of display elements 511 to compensate the irregularity. For example, because the irregularity may cause a first display element from a first view point being displayed together with a portion of a second and neighboring display element from a second view point and, if applicable, a portion of a third or more neighboring display element from a third or more view point, the controller may re-calculate or adjust the value for the first display element using the second display element or the second display element and the third or more display elements.

Figure 11:
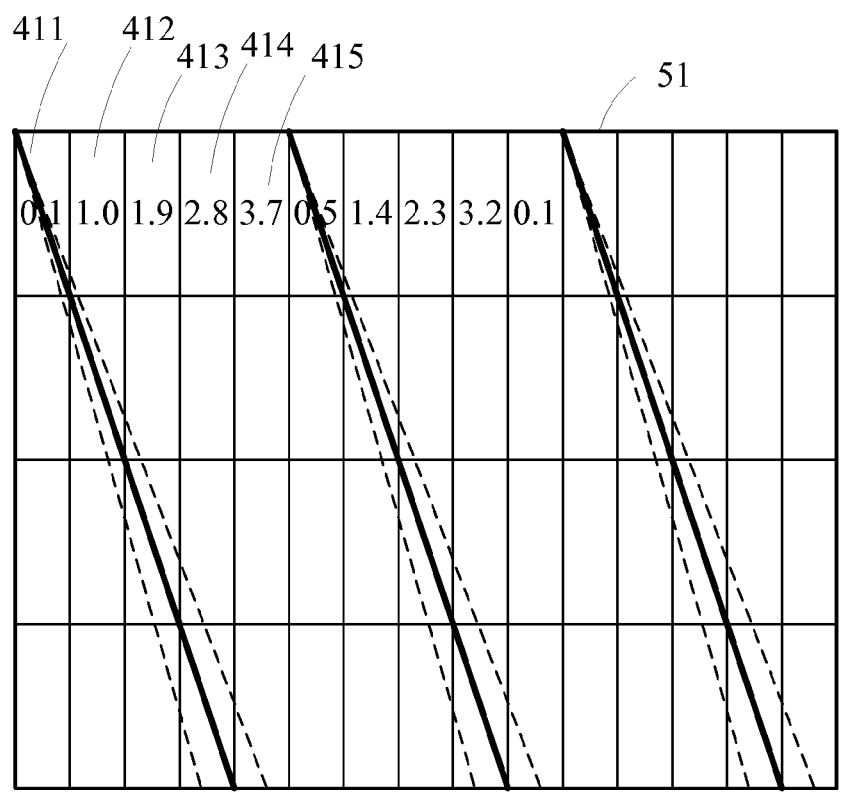
FIG. 11 illustrates another exemplary arrangement of a grating and a display panel consistent with the disclosed embodiments.

Further, the controller may use any appropriate type of algorithm to re-calculate or adjust values of each of display elements 511. For example, the controller may use an interpolation algorithm to adjust values of each of display elements 511 based on corresponding neighboring display elements. Other algorithm, however, may also be used. FIG. 11 illustrates another exemplary arrangement of grating 52 with respect to display panel 51 with display element adjustment ability.

As shown in FIG. 11, grating elements of grating 52 are arranged with a particular angle as explained previously. Irregularity may be introduced due to the relative arrangement of grating elements of grating 52 and display elements of display panel 51. For illustrative purposes, display elements (e.g., sub-pixels) from one row of display panel 51 between two actual ridge lines are listed as elements 411, 412, 413, 414, and 415. Each element may belong to an image of a different view point. For example, element 411 may belong to a first view point image, element 412 may belong to a second view point image, element 413 may belong to a third view point image, element 414 may belong to a fourth view point image, and element 415 may belong to a fifth view point image. Between neighboring elements or view point images, a certain parallax may be maintained for effecting 3D perception or 3D display. Other elements or viewpoints may also be used.

During operation, to compensate for the irregularity, the controller (not shown) may adjust the value of a particular display element of a view point image based on one or more other display elements from different view point images. The value of the particular display element may include a gray scalar value, a color scalar value, or any other value of a display element such as a pixel or a sub-pixel. For example, the controller may re-calculate the value of element 411 of the first view point image based on the original value of element 411 and the value of element 412 of the second view point image. In a multi-view format, the controller may re-calculate the value of a display element based on multiple images corresponding to multiple view points.

A decimal format number x.y may be used to represent a relationship between display elements for calculating the value of a particular display element. For example, integer part x may refer to the number of original or a base view point image, and fraction part y may refer to a percentage of the value of the element of the neighboring view point image or another view point image along the forward direction of ridge lines to be used to adjust the value of the original display element. For example, the respective value relationships of elements 411, 412, 413, 414, and 415 are 0.1, 1.0, 1.9, 2.8, and 3.7.

More particularly, for example, element 414 has a decimal number 2.8, whose integer part 2 means the original or base element is from the third view point image (starting from 0), thus the neighboring view point image along the forward direction of ridge lines is the fourth view point image, and fraction part 0.8 means eighty (80) percentage of the element from fourth view point image should be counted to calculate the value of element 414, while remaining twenty (20=100−80) percentage from the original or base view point image (i.e., the third view point image) should be counted. That is: current value (element 414)=original value (element 413)× 20%+original value (element 414)×80%.

Similarly, element 411 has a decimal number of 0.1, current value (element 411)=original value (element 411)×90%+ original value (element 412)×10%. Element 412 has a decimal number of 1.0, no recalculation is need since none of other view point image should be counted. Further, element 413 has a decimal number of 1.9, current value (element 413)=original value (element 412)×10%+original value (element 413)×90%. Element 415 has a decimal number of 3.7, current value (element 415)=original value (element 414)× 30%+original value (element 415)×70%. The original value may include color, non-color, or other type of value of display elements. Other algorithms may also be used.

Thus, during operation, values of display elements of display panel 51 are re-calculated or adjusted before the values of display elements are displayed to reduce irregularities because of the particular angle of arrangement for grating 52 and display panel 51. The re-calculated or adjusted values may then be displayed on display panel 51. The set of adjustment numbers of all display elements of display panel 51 may be pre-determined or stored in a database or other storage medium, such as a hard disk, on display apparatus 50. Further, more than one set of adjustment numbers of display elements of display panel 51 may be used, and a user of display apparatus 50 may select a particular set of adjustment numbers or may modify a particular set of adjustment numbers through certain user input devices.

Figure 12:
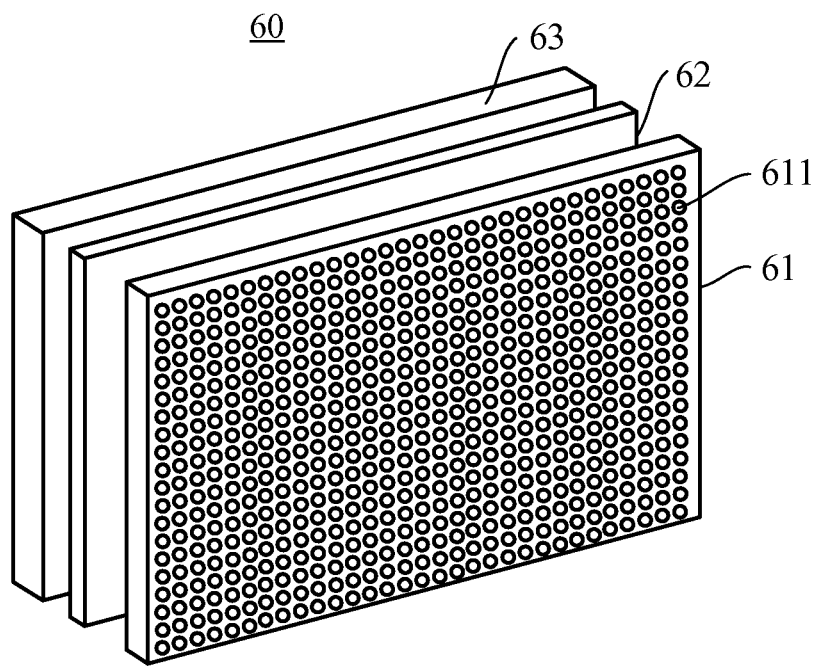
FIG. 12 illustrates another exemplary autostereoscopic display apparatus consistent with the disclosed embodiments.

FIG. 12 illustrates another exemplary autostereoscopic display apparatus 60 consistent with the disclosed embodiment. As shown in FIG. 12, similar to autostereoscopic display apparatus 50, autostereoscopic display apparatus 60 comprises a display panel 61, a grating 62, and a backlight panel 63. Display panel 61 comprises a plurality of individually addressable, regularly spaced, and substantially identical display elements 611. Display elements 611 may be arranged in rows and columns.

Further, different from autostreroscopic display apparatus 50, grating 62 is positioned between backlight panel 63 and display panel 61. Grating 62 is aligned substantially parallel to display panel 61

Lights from backlight panel 63 may enter grating 62 first. Grating 62 may guide the lights from backlight panel 63 into different viewing directions to illuminate display panel 61. Display elements 611 may further respectively receive the lights from different viewing directions and may also modulate the received lights to display 3D images.

Figure 13:
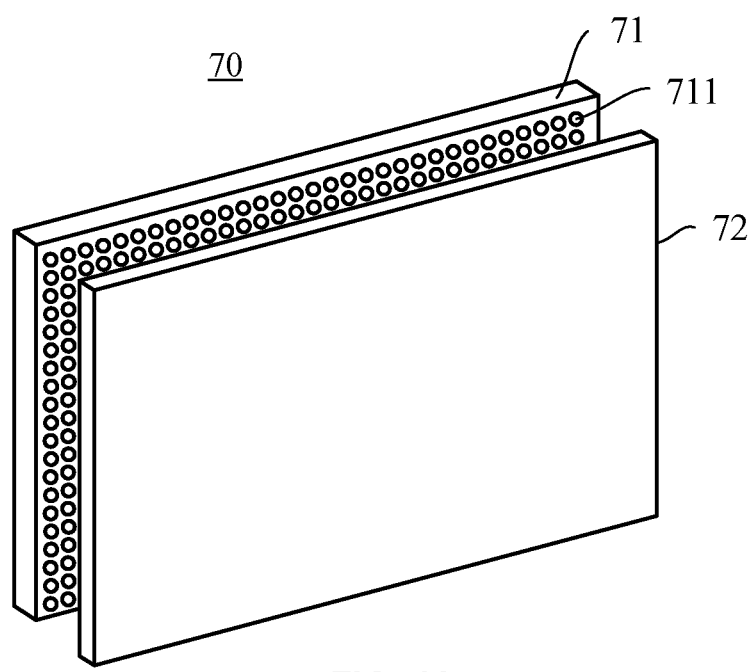
FIG. 13 illustrates another exemplary autostereoscopic display apparatus consistent with the disclosed embodiments.

FIG. 13 illustrates another exemplary autostereoscopic display apparatus 70 consistent with the disclosed embodiment. As shown in FIG. 13, autostereoscopic display apparatus 70 comprises a display panel 71 and a grating 72. Similar to autostereoscopic display apparatus 50, grating 72 is aligned substantially parallel to display panel 71 or closely coupled to display panel 71, and display panel 71 may include a plurality of individually addressable, regularly spaced, and substantially identical display elements 711 arranged in rows and columns. Different from autostereoscopic display apparatus 50, however, display panel 71 may be a self-luminous or light-emitting display panel that actively emits lights without a need of a backlight panel. Thus, grating 72 and display panel 71 may be coupled to provide 3D display.

The disclosed systems and methods can effectively reduce or remove Moire pattern in 3D display and also improve display quality of the 3D display. The disclosed arrangements of gratings and display panels can achieve effects of even separation of display elements while maintain a large adjustment range to fit structures of most display elements of display panels in the market.

What is claimed is:

1. A three-dimensional (3D) display apparatus for displaying a 3D image, comprising:
    a display panel having a plurality of display pixels arranged in a two-dimensional array, wherein the plurality of display pixels include a first set of display pixels displaying a first view point image of the 3D image and a second set of display pixels displaying a second view point image of the 3D image; and
    a grating device coupled to the display panel and having a plurality of grating elements to guide lights associated with the plurality of display pixels into predetermined viewing directions,
    wherein:
    the grating device is one of a lenticular lens grating and a slit grating;
    the plurality of grating elements cover the plurality of display pixels and are tilted by rotating a ridge line direction of the plurality of grating elements with respect to a diagonal direction of the plurality display pixels by a non-zero angle from a direction parallel to the diagonal direction such that a tilted direction of the plurality of grating elements forms the non-zero angle with respect to the diagonal direction of the plurality display pixels to reduce Moire patterns based on irregularity caused by the rotated ridge line direction;
    a controller of the 3D display apparatus re-calculates a display value of a display pixel from the first set of display pixels based on an original value of the display pixel and an original value of a neighboring display pixel from the second set of display pixels,
    wherein, provided that x and y are integers, the controller of the 3D display apparatus associates a decimal number x.y with a display pixel for re-calculating the value of the display pixel and re-calculates the display value of the display pixel according to the decimal number x.y, wherein x indicates which number of view point image of the 3D image the display pixel is from and y indicates a percentage of the display value of a neighboring display pixel from a different view point image to be included in the display value of the display pixel.

2. The 3D display apparatus according to claim 1, wherein the plurality of grating elements are arranged in parallel to one another.

3. The 3D display apparatus according to claim 1, wherein the plurality of grating elements have a same pitch value.

4. The 3D display apparatus according to claim 1, wherein with the diagonal direction being a reference, the non-zero angle between the tilted direction and the diagonal direction is set between approximately 10 degrees clockwise to 5 degrees counter-clockwise.

5. The 3D display apparatus according to claim 1, wherein with the diagonal direction being a reference, the non-zero angle between the tilted direction and the diagonal direction is set between approximately 7 degrees clockwise to 2 degrees counter-clockwise.

6. The 3D display apparatus according to claim 1, wherein the plurality of grating elements are further shifted horizontally such that the ridge lines of the plurality of grating elements have an offset with respect to the diagonal lines of the plurality display elements.

7. The 3D display apparatus according to claim 1, wherein the second view point image is a neighboring view point image of the first view point image along the tilted direction of the plurality of grating elements.

8. The 3D display apparatus according to claim 1, further including:
    a backlight panel configured to provide lights for the display panel, wherein the grating is positioned between the backlight panel and the display panel.

9. A grating device for use in a three-dimensional (3D) display apparatus having a display panel having a plurality of display pixels arranged in a two-dimensional array, comprising:
    a plurality of grating elements configured to cover the plurality of display elements to guide lights associated with the plurality of display pixels into predetermined viewing directions,
    wherein:
    the plurality of display pixels include a first set of display pixels displaying a first view point image of the 3D image and a second set of display pixels displaying a second view point image of the 3D image;
    the grating device is one of a lenticular lens grating and a slit grating;
    the plurality of grating elements cover the plurality of display pixels and are tilted by rotating a ridge line direction of the plurality of grating elements with respect to a diagonal direction of the plurality display pixels by a non-zero angle from a direction parallel to the diagonal direction such that a tilted direction of the plurality of grating elements forms the non-zero angle with respect to the diagonal direction of the plurality display pixels to reduce Moire patterns based on irregularity caused by the rotated ridge line direction;
    a controller of the 3D display apparatus re-calculates a display value of a display pixel from the first set of display pixels based on an original value of the display pixel and an original value of a neighboring display pixel from the second set of display pixels,
    wherein, provided that x and y are integers, the controller of the 3D display apparatus associates a decimal number x.y with a display pixel for re-calculating the value of the display pixel and re-calculates the display value of the display pixel according to the decimal number x.y, wherein x indicates which number of view point image of the 3D image the display pixel is from and y indicates a percentage of the display value of a neighboring display pixel from a different view point image to be included in the display value of the display pixel.

10. The grating according to claim 9, wherein the plurality of grating elements are arranged in parallel to one another.

11. The grating according to claim 9, wherein the plurality of grating elements have a same pitch value.

12. The grating according to claim 9, wherein with the diagonal direction being a reference, the non-zero angle between the tilted direction and the diagonal direction is set between approximately 10 degrees clockwise to 5 degrees counter-clockwise.

13. The grating according to claim 9, wherein with the diagonal direction being a reference, the non-zero angle between the tilted direction and the diagonal direction is set between approximately 7 degrees clockwise to 2 degrees counter-clockwise.

14. The grating according to claim 9, wherein the plurality of grating elements are further shifted horizontally such that the ridge lines of the plurality of grating elements have an offset with respect to the diagonal lines of the plurality display pixels.

15. A grating for use in three-dimensional (3D) display apparatus having a display panel having a plurality of display pixels arranged in a two-dimensional array and the plurality of display elements being separated by a plurality of mask lines formed in a mask line grid, comprising:

a plurality of grating elements configured to cover the plurality of display elements to guide lights associated with the plurality of display pixels into predetermined viewing directions, wherein:

the plurality of display pixels include a first set of display pixels displaying a first view point image of the 3D image and a second set of display pixels displaying a second view point image of the 3D image;

the grating is one of a lenticular lens grating and a slit grating;

the plurality of grating elements cover the plurality of display pixels and are tilted by rotating a ridge line direction of the plurality of grating elements with respect to a diagonal direction of the plurality display pixels by a non-zero angle from a direction parallel to the diagonal direction such that a tilted direction of the plurality of grating elements forms the non-zero angle with respect to the diagonal direction of the plurality display pixels to reduce Moire patterns based on irregularity caused by the rotated ridge line direction;

a controller of the 3D display apparatus re-calculates a display value of a display pixel from the first set of display pixels based on an original value of the display pixel and an original value of a neighboring display pixel from the second set of display pixels, wherein, provided that x and y are integers, the controller of the 3D display apparatus associates a decimal number x.y with a display pixel for re-calculating the value of the display pixel and re-calculates the display value of the display pixel according to the decimal number x.y, wherein x indicates which number of view point image of the 3D image the display pixel is from and y indicates a percentage of the display value of a neighboring display pixel from a different view point image to be included in the display value of the display pixel.

16. A method for use in a three-dimensional (3D) display apparatus having a display panel having a plurality of display elements arranged in a two-dimensional array, wherein the plurality of display pixels include a first set of display pixels displaying a first view point image of the 3D image and a second set of display pixels displaying a second view point image of the 3D image, the method comprising:

covering the plurality of display pixels using a plurality of grating elements of a grating, wherein the grating device is one of a lenticular lens grating and a slit grating;

configuring the plurality of grating elements to be tilted by rotating a ridge-line direction of the plurality of grating elements with respect to a diagonal direction of the plurality display pixels by a non-zero angle from a direction parallel to the diagonal direction such that a tilted direction of the plurality of grating elements forms the non-zero angle with respect to the diagonal direction of the plurality display pixels to reduce Moire patterns based on irregularity caused by the rotated ridge line direction;

re-calculating, by a controller of the 3D display apparatus, a display value of a display pixel from the first set of display pixels based on an original value of the display pixel and an original value of a neighboring display pixel from the second set of display pixels; and guiding lights associated with the plurality of display pixels into predetermined viewing directions by the plurality of grating elements.

17. The method according to claim 16, wherein with the diagonal direction being a reference, the non-zero angle between the tilted direction and the diagonal direction is set between approximately 10 degrees clockwise to 5degrees counter-clockwise.

18. The method according to claim 16, wherein with the diagonal direction being a reference, the non-zero angle between the tilted direction and the diagonal direction is set between approximately 7 degrees clockwise to 2 degrees counter-clockwise.

19. The method according to claim 16, further comprising: configuring the plurality of grating elements to be further shifted horizontally such that the ridge lines of the plurality of grating elements have an offset with respect to the diagonal lines of the plurality display pixels.

20. The 3D display apparatus according to claim 1, wherein:

the plurality of display pixels further include a third set of display pixels displaying a third view point image of the 3D image; and the controller of the 3D display apparatus re-calculates a display value of a display pixel from the second set of display pixels based on an original value of the display pixel and an original value of a neighboring display pixel from the third set of display pixels.

21. The 3D display apparatus according to claim 20, wherein:

the controller of the 3D display apparatus re-calculates display values of the first set of display pixels using gray scalar values such as to reduce irregularities caused by a particular angle of arrangement between the grating device and the display panel.

22. The 3D display apparatus according to claim 21, wherein:

the controller of the 3D display apparatus re-calculates the display values of the first set of display pixels based on multiple view point images.

23. The 3D display apparatus according to claim 21, wherein:

more than one sets of re-calculated display values of the first set of display pixels are predetermined and stored in the 3D display apparatus; and the controller of the 3D display apparatus select a particular set of re-calculated display values of the first set of display pixels through user input.

* * * * *